US011619130B1

(12) United States Patent
Jones et al.

(10) Patent No.: US 11,619,130 B1
(45) Date of Patent: Apr. 4, 2023

(54) FERROFLUIDIC SEALING TECHNOLOGY FOR SAMPLING WHILE ROTATING AND DRILLING

(71) Applicant: Halliburton Energy Services, Inc., Houston, TX (US)

(72) Inventors: Christopher Michael Jones, Houston, TX (US); Darren George Gascooke, Houston, TX (US); Mehdi Ali Pour Kallehbasti, Houston, TX (US); Anthony Herman Van Zuilekom, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/505,221

(22) Filed: Oct. 19, 2021

(51) Int. Cl.
*E21B 49/08* (2006.01)
*E21B 33/10* (2006.01)
*F16J 15/43* (2006.01)

(52) U.S. Cl.
CPC .............. *E21B 49/08* (2013.01); *E21B 33/10* (2013.01); *F16J 15/43* (2013.01)

(58) Field of Classification Search
CPC ............ E21B 49/08; E21B 33/10; F16J 15/43
See application file for complete search history.

(56) References Cited

U.S. PATENT DOCUMENTS

| 5,803,186 A * | 9/1998 | Berger .................. E21B 49/008 166/264 |
|---|---|---|
| 2009/0255729 A1 | 10/2009 | Georgi et al. |
| 2015/0315868 A1 * | 11/2015 | Fripp ...................... E21B 33/10 166/387 |

FOREIGN PATENT DOCUMENTS

| EP | 0777813 A1 | 6/1997 |
| WO | 2006130338 A1 | 12/2006 |
| WO | 2016039719 A1 | 3/2016 |

OTHER PUBLICATIONS

Van Der Wal, Karoen et al., "Ferrofluid Rotary Seal with Replenishment System for Sealing Liquids," Tribology International, Oct. 2020, vol. 150, 32 pages, Elsevier Ltd.
Foreign Communication from Related Application—International Search Report and Written Opinion of the International Searching Authority, International Application No. PCT/US2021/056132, dated Jul. 8, 2022, 14 pages.

* cited by examiner

*Primary Examiner* — Nicole Coy
*Assistant Examiner* — Nicholas D Wlodarski
(74) *Attorney, Agent, or Firm* — Conley Rose, P.C.; Rodney B. Carroll (57) ABSTRACT

A formation sampling tool including a plurality of ferrofluidic seals for sealing the formation sampling tool against a wellbore wall of a wellbore, each adjacent pair of the plurality of ferrofluidic seals defining a formation fluid inflow section through which formation fluid enters the formation sampling tool via fluid inflow lines, wherein a first ferrofluidic seal of the plurality of ferrofluidic seals is distal a drill bit, and wherein a last ferrofluidic seal of the plurality of ferrofluidic seals is proximate the drill bit; a formation fluid sampling line, wherein the formation fluid sampling line is in fluid communication with the one or more fluid inflow lines; one or more sensors in fluid communication with the one or more fluid inflow lines and/or the formation fluid sampling line; and a pump configured to pump formation fluid into the formation sampling tool via each of the formation fluid inflow sections.

20 Claims, 5 Drawing Sheets

FERROFLUIDIC SEALING TECHNOLOGY FOR SAMPLING WHILE ROTATING AND DRILLING

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to formation sampling. More specifically, the present disclosure relates to formation sampling while drilling. Still more specifically, the present disclosure relates to formation sampling while drilling via a formation sampling tool comprising a plurality of ferrofluidic seals.

BACKGROUND

Formation fluid sampling is performed to determine the characteristics of formation fluid in a reservoir. Formation sampling tools can be utilized to sample the formation fluid.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

Disclosed herein are systems and methods for formation sampling while drilling and or rotating. Description of a formation sampling tool of this disclosure will now be made with reference to FIG. 1, which is a schematic of a formation sampling tool 100 (also referred to as a "formation tester"), according to embodiments of this disclosure. Formation sampling tool 100 (also referred to herein as a "formation sampling system" 100) comprises: a plurality of ferrofluidic seals 20 (also referred to herein as "ferrofluidic sealing elements" 20) for sealing the formation sampling tool 100 against a wellbore wall 35 of a wellbore 30. Each adjacent pair of the plurality of ferrofluidic seals 20 defines a formation fluid inflow section 40 through which formation fluid 45 from a formation 50 enters the formation sampling tool 100 via one or more fluid inflow lines 55. The formation sampling tool 100 has a housing 84 having an outside surface 85. The housing 84 has ports 86 disposed between the adjacent pairs of the plurality of ferrofluidic seals 20. The ports 86 are in fluid communication with one or more fluid inflow lines 55. A first ferrofluidic seal 20' of the plurality of ferrofluidic seals 20 is farther from a drill bit 15 than any of the other ferrofluidic seals 20 (i.e., is "distal" the drill bit 15), and a last ferrofluidic seal 20" of the plurality of ferrofluidic seals 20 is closer to the drill bit 15 than any remaining ferrofluidic seals 20 (i.e., is "proximate" the drill bit 15). Formation sampling tool 100 further comprises a formation fluid sampling line 60. The formation fluid sampling line 60 is in fluid communication with the one or more fluid inflow lines 55, such that formation fluid can be taken from the one or more fluid inflow lines 55 into the formation fluid sampling line 60. One or more sensors S are in fluid communication (also referred to herein as "fluidically coupled") with the one or more fluid inflow lines 55 and/or the formation fluid sampling line 60, the one or more sensors S operable to measure one or more parameters of the fluid in the one or more fluid inflow lines 55 and/or the formation fluid sampling line 60, respectively. As utilized herein, components are in fluid communication (or "fluidically coupled") when they are capable of or configured to pass fluid flow between the components regardless of whether or not fluid is actually present. In aspects, the claimed formation sampling tool 100 is a "dry" tool comprising no formation fluid and no circulating ferrofluid (e.g., the ferrofluid is all within the ferrofluid reservoir 95 described hereinbelow, such as prior to the start of pumping of formation fluid through the formation sampling tool 100), and in embodiments, the claimed formation sampling tool 100 is a "wet" tool comprising formation fluid and/or circulating ferrofluid (e.g., such as subsequent the start of pumping of formation fluid 45 through the formation sampling tool 100); both are intended to be included in this disclosure. Formation sampling tool 100 further includes a pump 70 configured to pump formation fluid into the formation sampling tool 100 via each of the formation fluid inflow sections 40. Pump 10 is in fluid communication with the one or more fluid inflow lines 55 and the formation fluid sampling line 60, as well as with discharge outlet 75 described further hereinbelow.

Figure 1:
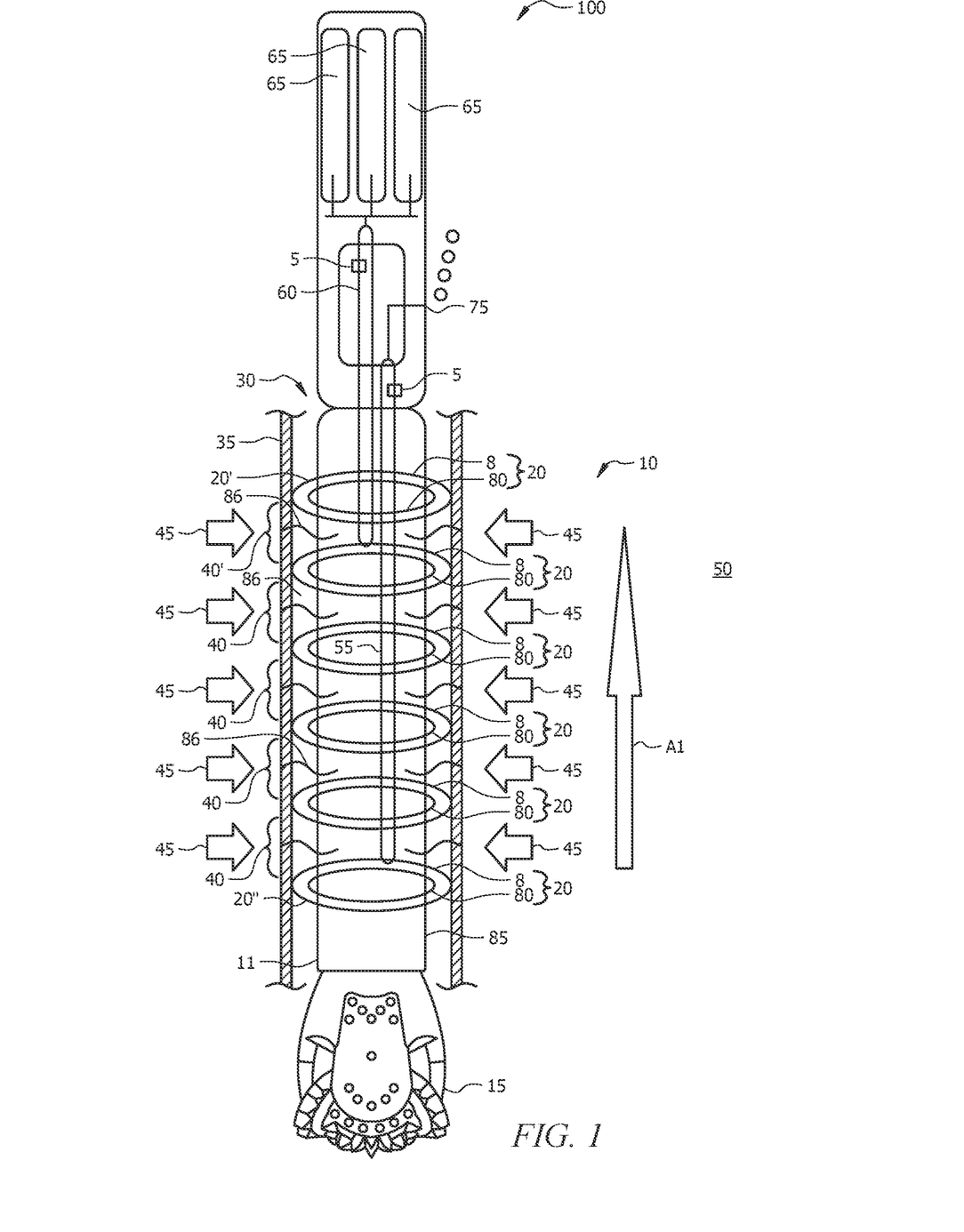
FIG. 1 is a schematic of a formation sampling tool, according to embodiments of this disclosure.

The formation fluid sampling line 60 can be in fluid communication with one or more sample chambers 65, whereby formation fluid sample(s) can be taken from formation fluid sampling line 60 and stored in the one or more sample chambers 65.

Formation sampling tool 100 further comprises a discharge outlet 75. The discharge outlet 75 is in fluid communication with the one or more fluid inflow lines 55. The discharge outlet 75 can be configured for discharge of formation fluid 45 from the formation sampling tool 100 into the wellbore 30 at a location farther from the drill bit 15 than the first ferrofluidic seal 20' (e.g., farther uphole from the drill bit 15 than the first ferrofluidic seal 20'). In other embodiments the discharge outlet 75 can be more proximal to the drill bit 15.

Figure 2:
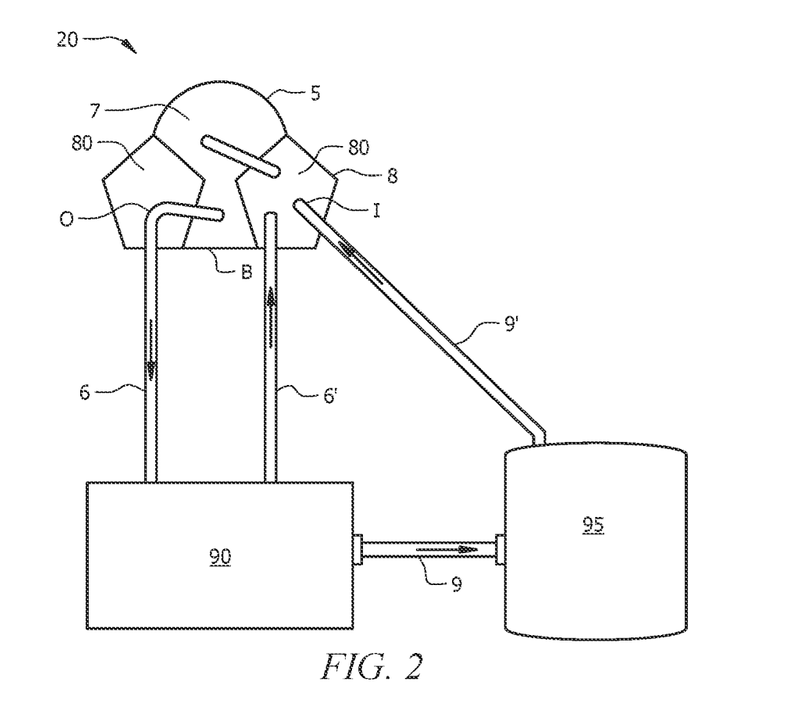
FIG. 2 is a schematic illustration of a ferrofluidic seal and associated regenerating section and reservoir, according to embodiments of this disclosure.

In embodiments, each of the plurality of ferrofluidic seals 20 is provided by one or more magnets 80 (also referred to herein as "magnetic elements" 80) about (e.g., attached to and/or adjacent) an outside surface 85 of the formation sampling tool 100. As depicted in FIG. 2, which is a schematic illustration of a ferrofluidic seal 20 and associated regenerating section 90 and reservoir 95, according to embodiments of this disclosure, the one or more magnets 80 define a region 7 of continuously circulating ferrofluid 5. Magnets 80 can be focused or otherwise shaped in order to increase the magnetic field, or smooth the magnetic field in various sections.

The formation sampling tool 100 can further comprise one or more shielding elements 8. In embodiments, each of the one or more shielding elements 8 can be metallic or ceramic or another material, so long as the shielding elements 8 have structural integrity and rigidity such that they maintain form throughout the drilling process and do not fail.

The formation sampling tool 100 can further comprise a bypass section 25 (FIG. 6, described further hereinbelow) via which cuttings and drilling fluid pass through and/or around the formation sampling tool 100, when the formation sampling tool is utilized for sampling while drilling. The bypass section 25 prevents intermixing of the drilling fluid and cuttings with the formation fluid 45 being sampled or discharged by the formation sampling tool 100, or with the continuously circulating ferrofluid 5, while allowing the drill cuttings and drilling fluid to return to surface.

As depicted in FIG. 2, formation sampling tool 100 can further comprise a ferrofluid reservoir 95 in fluid communication with each of the plurality of ferrofluidic seals 20. The ferrofluid reservoir 95 comprises a surplus of ferrofluid 5 above a circulating amount of the ferrofluid 5. The circulating amount of ferrofluid is a total amount of ferrofluid 5 circulating between the magnets 80 of the ferrofluidic seals 20 to maintain the seals between the formation sampling tool 100 and the wellbore walls 35. A surplus of ferrofluid 5 is an amount of ferrofluid greater than the circulating amount. For example the surplus of ferrofluid can comprise greater than or equal to about 5, 10, 15, 20, or 25 volume percent (vol %) more ferrofluid than the circulating amount of the ferrofluid 5.

As depicted in FIG. 2, formation sampling tool 100 can further comprise a regenerating section 90 (also referred to herein as a "cleaning section" 90 or a "recycling section" 90) section 90 in fluid communication with each of the plurality of ferrofluidic seals 20, wherein the regenerating section 90 is configured to continuously clean the circulating ferrofluid 5.

The ferrofluid 5 can circulate from regeneration section 90 and/or reservoir 95 to each of the ferrofluidic seals 20 via regenerating section outlet line 6' and/or reservoir outlet line 9', respectively, and an inlet I of the ferrofluidic seal 20 proximate one of the magnets 80, through the region 7 of continuously circulating ferrofluid to another one of the magnets 80, and via an outlet O proximate the another of the magnets 80 and regenerating section inlet line 6 to regenerating section 90. A pump 70' can be utilized to continuously circulate the ferrofluid 5. In FIG. 1, pump 70', associated valving and reservoir 95 for ferrofluid 5 can be contained in the inner box 3. These components will be described hereinbelow in more detail with reference to FIG. 4.

As depicted in FIG. 2, in embodiments, the one or more magnets 80 can include two (e.g., pentagonal) ring magnets 80, a first one providing the inlet I and the second providing the outlet O. The region 7 of continuously circulating ferrofluid 5 provides the liquid seal between the formation sampling tool 100 and the wellbore wall 35. Although depicted as having a pentagonal cross section, the ring magnets utilized as the one or more magnets 80 can have cross sections of other shapes, such as, without limitation, triangular (i.e., triagonal), rectangular, square, circular, etc. The ring magnets can be connected at a base B thereof, or can be connected to the outer surface 85 of the formation sampling tool 100. In aspects, shielding elements 8 are pentagonal, and associated magnets 80 surrounded thereby are another shape or pentagonal.

Figure 3:
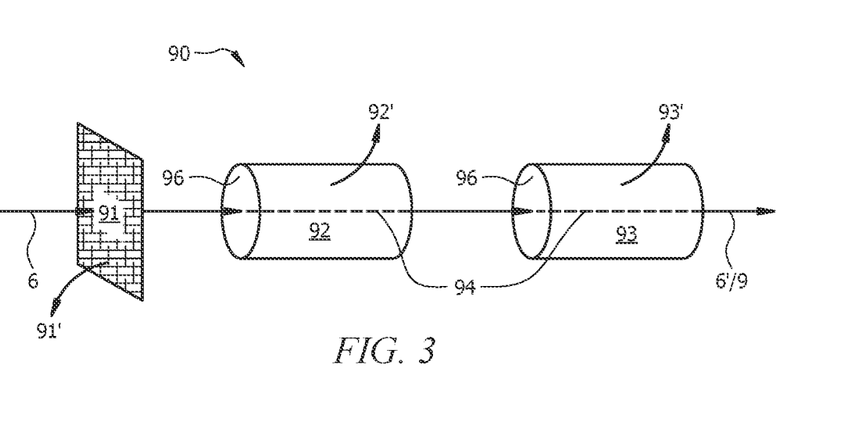
FIG. 3 is a schematic of a regenerating section of a formation sampling tool, according to embodiments of this disclosure.

The regeneration section 90 is configured to clean the circulating ferrofluid in regenerating section inlet line 6, for example, by removing one or more components therefrom, such as, without limitation, solids, water, and/or organics (e.g., hydrocarbons, oil). For example, as depicted in FIG. 3, which is a schematic of a regenerating section 90 of a formation sampling tool 100, according to embodiments of this disclosure, a regenerating section 90 can comprise a filter 91 configured for the removal of particulates from the circulating ferrofluid 5, an aqueous semipermeable membrane or aqueous semipermeable tube 92 configured for the removal of water from the circulating ferrofluid 5, an organic semipermeable membrane or organic semipermeable tube 93 configured for the removal of organic liquid from the circulating ferrofluid 5, or a combination thereof, and thus provide a regenerated ferrofluid 5. The regenerated ferrofluid 5 can be circulated from regenerating section 90 to ferrofluidic seal(s) 20 via regenerating section outlet line 6', and/or can be introduced via reservoir inlet line 9 into reservoir 95 and from reservoir 95 into ferrofluidic seal(s) 20 via reservoir outlet line 9'.

As depicted in FIG. 3, the aqueous semipermeable membrane or tube 92, the organic semipermeable membrane or tube 93, or both can comprise a magnetic wire or magnetic element 94 on an inlet side 96 thereof to prevent the ferrofluid 5 from leaking through the aqueous semipermeable membrane or tube 92, the organic semipermeable membrane or tube 93, or both, respectively. For example, when the inlet side of the aqueous semipermeable membrane or tube 92, the organic semipermeable membrane or tube 93, or both is the inside thereof, the magnetic wire or magnetic element 94 can be on an inside of the aqueous semipermeable membrane or tube 92, the organic semipermeable membrane or tube 93, or both.

Although a single ferrofluidic seal 20 is depicted in FIG. 2, a formation sampling tool 100 of this disclosure can comprise a single regenerating section 90 and/or a single reservoir 95, and the plurality (e.g., 2, 3, 4, 5, 6, 7, 8, 9, 10, or more) of ferrofluidic seals 20, or, alternatively, a formation sampling tool 100 of this disclosure can comprise multiple regenerating sections 90 and/or multiple reservoirs 95, each able to regenerate any portion of the ferrofluidic fluid with respect to any combination of solids, aqueous liquids and/or organic liquids.

In embodiments, a formation sampling tool 100 comprises: a housing 84 and a plurality of ferrofluidic seals 20 disposed about the housing 84 and providing a seal between a wellbore wall 35 of a wellbore 30 being drilled and the formation sampling tool 100, wherein each of the ferrofluidic seals comprise a ferrofluid substantially continuously circulating between magnetic elements 80. The magnetic elements 80 can be as described hereinabove. The formation sampling tool 100 can further comprise a regenerating section 90, a ferrofluid reservoir 95, or both, wherein the regenerating section 90 is in fluid communication with each of the plurality of ferrofluidic seals 20 and is configured to continuously clean the continuously circulating ferrofluid 5, and wherein the ferrofluid reservoir 95 is in fluid communication with each of the plurality of ferrofluidic seals 20, and contains a surplus of ferrofluid 5 above a circulating amount of the ferrofluid 5. The formation sampling tool 100 can further comprise a bypass section 25 via which cuttings and drilling fluid pass through or around the formation sampling tool 100.

Figure 4:
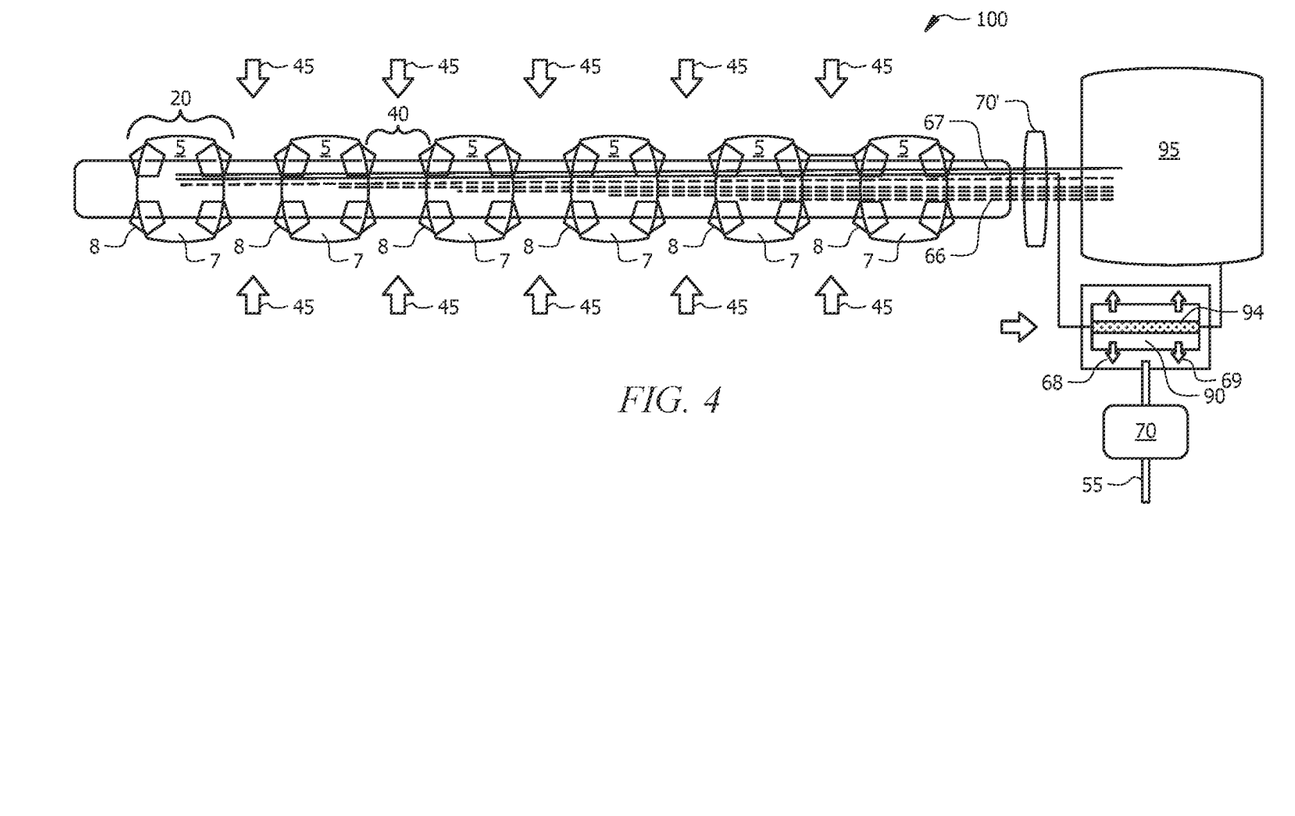
FIG. 4 is a cross-section of a formation sampling tool, according to embodiments of this disclosure.

FIG. 4 is a cross-section of a formation sampling tool 100 according to this disclosure, in which inner flow paths are not shown. The shaded region indicates the ferrofluid 5 in the regions 7 of continuously circulating ferrofluid 5 and the pentagonal shielding elements 8 form a donut shape 360° around the outside surface 85 of the formation sampling tool 100. The magnets 80 are contained within the shielding elements 8 and also extend 360° around the outside surface 85 of the formation sampling tool 100. The ferrofluid 5 extends beyond the surface of the shielding elements 8 and makes contact with the formation 50. The shielding elements 8 may bump into the formation 50 from time to time, but keep the magnets 80 protected and the ferrofluid 5 in place within the regions 7 of circulating ferrofluid 5. The ferrofluid 5 may extend beyond the shielding elements 8 by a sufficient amount to seal with the formation 50 and the extent can be controlled with both the magnetic field shape (shaping) and the amount of ferrofluid 5 in the shielded region, i.e., in the regions 7 of continuously circulating ferrofluid 5. The regions 7 of continuously circulating ferrofluid 5 may be in hydraulic contact or not within hydraulic contact from within the tool 100. That is, separate refresh paths or combination refresh paths for the ferrofluid 5 may connect the shielded regions 8 to the reservoir 95 or the cleaning system (e.g., regenerating/recycling section 90. In FIG. 4, flow paths 66 connect the reservoir 95 to each ferrofluidic seal 20, and flow path 67 provides a continual path (round trip). Although continual flow path 67 is depicted passing through the regenerating/recycling section 90, in alternative or additional embodiments, the flow paths 66 can pass through regenerating/recycling section 90. The ferrofluid 5 pump 70' can comprise one or multiple pumps having valving to control the amount of ferrofluid 5 from the reservoir 95 or regenerating/recycling section 90 to each ferrofluidic seal 20. As depicted in FIG. 4, the ferrofluid 5 is cleaned to the reservoir 95 and then to the ferrofluidic seals 20. Water waste separated via regenerating/recycling section 90 can be eliminated as depicted at 68, and organic waste separated via regenerating/recycling section 90 can be eliminated as depicted at 69.

Figure 5:
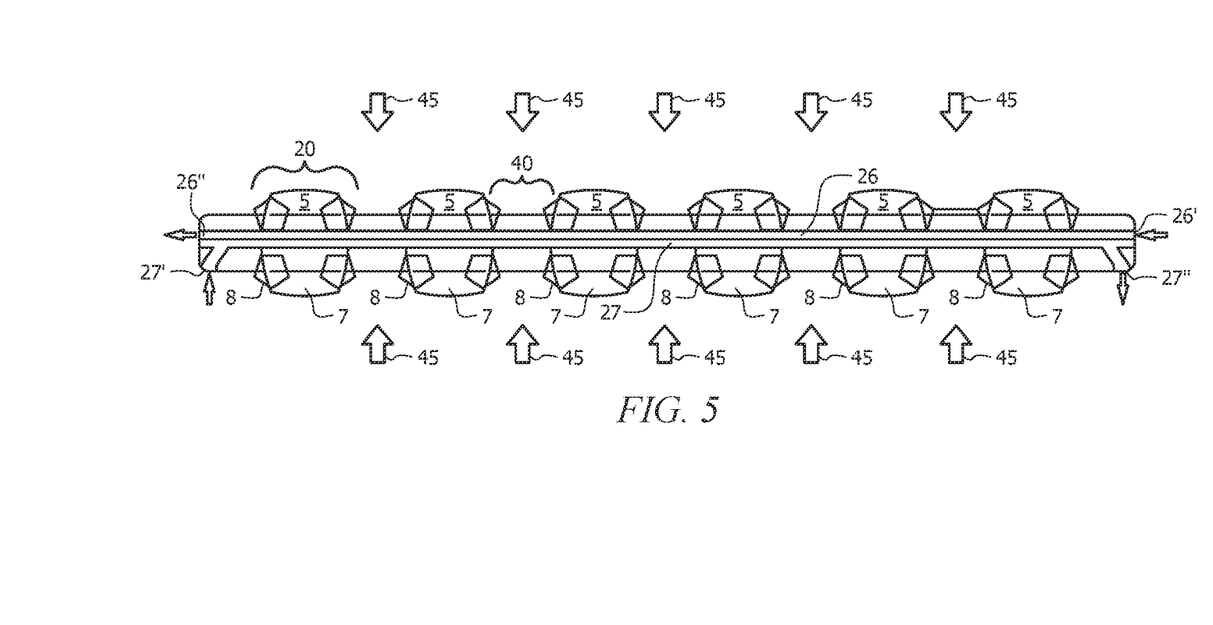
FIG. 5 is a cross-section of a portion of a formation sampling tool, depicting the bypass section 25, according to embodiments of this disclosure.

For clarity, although present, the bypass or "plumbing" section 25 for drilling mud flow and cuttings flow through the formation sampling tool 100 is not shown in FIG. 1 or FIG. 4. FIG. 5 is a cross-section of a portion of a formation sampling tool 100, depicting bypass section 25, according to embodiments of this disclosure. Bypass section 25 can comprise at least two flow paths, including a drilling mud flow path 26 and a drill cuttings flow path 27. Drill cuttings flow path 27 allows drill cuttings to move from the lower section of the wellbore proximate drill bit 15 (from the left in FIG. 5) to the upper section of the wellbore distal drill bit 15 (to the right in FIG. 5). Although in FIG. 5, a single drill cuttings flow path 27 and a single drilling mud flow path 26 are shown, formation sampling tool 100 can comprise one or more bypass section 25, and one or more drill cuttings flow paths 27 and/or drilling mud flow paths 26. As depicted in FIG. 5, drill cuttings flow path 27 has a single cuttings bypass inlet 27' and a single cuttings bypass outlet 27". However, there can be multiple inlets and outlets attached to the same drill cuttings flow path 27, e.g., azimuthally and/or axially. Drilling mud flow path 26 provides for the flow of drilling fluid (or "mud") to the drill bit 15. Drilling fluid flow path 26 has a drilling fluid inlet 26' and a drilling fluid outlet 26". The drilling fluid flowing to the drill bit 15 creates a roundtrip flow from the surface of the wellbore 30 to the drill bit 15 with a return of drilling fluid to the surface. The drilling fluid that returns to the surface cannot be blocked by the ferrofluidic seals 20 with the formation 50, so bypass 25 allows the round trip flow and prevents pressure buildup below the ferrofluidic seals 20. Flow of the drilling fluid along drill cuttings flow line 27 back to the surface carries drill cuttings, e.g., chips of rock created by the drill bit 15 as it bores through the rock of the formation 50.

Also disclosed herein is a method of formation sampling. A method of formation sampling will now be described with reference to FIG. 6, which is a schematic flow diagram of a method 200 of formation sampling, according to embodiments of this disclosure. Method 200 of formation sampling comprises: at 210, during drilling of a wellbore 30, positioning a formation sampling tool 100 of a bottom hole assembly (BHA) 10 within the wellbore 30. The formation sampling tool 100 can be as described hereinabove with reference to FIG. 1-FIG. 3. For example, in aspects, the formation sampling tool 100 can comprise: a plurality of magnets 80 attached about an outside surface 85 of the formation sampling tool 100, which may or may not be shielded with an appropriate material such as a metal or ceramic or other suitable material such that the magnetic flux is sufficiently strong through the material and such that the material protects the magnet and has structural rigidity and/or integrity, and configured to provide a plurality of ferrofluidic seals 20 for sealing the formation sampling tool 100 against a wellbore wall 35 of a wellbore 30, each adjacent pair of the plurality of ferrofluidic seals 20 defining a formation fluid inflow section 40 through which formation fluid 45 from a formation 50 enters the formation sampling tool 100 via one or more fluid inflow lines 55, wherein a first ferrofluidic seal 20' of the plurality of ferrofluidic seals 20 is distal to a drill bit 15, and wherein a last ferrofluidic seal 20" of the plurality of ferrofluidic seals 20 is proximate the drill bit 15, and wherein each of the one or more magnets 80 define a region 7 for continuously circulating ferrofluid 5, a formation fluid sampling line 60, wherein the formation fluid sampling line 60 is in fluid communication with the one or more fluid inflow lines 55; one or more sensors S in fluid communication with the one or more fluid inflow lines 55 and/or the formation fluid sampling line 60; a ferrofluid reservoir 95 in fluid communication with each of the plurality of ferrofluidic seals 20, the ferrofluid reservoir 95 comprising a surplus of ferrofluid 5 above a circulating amount of the ferrofluid 5; a bypass section 25 via which cuttings and drilling fluid pass through the formation sampling tool 100; a discharge outlet 75, wherein the discharge outlet 75 is in fluid communication with the one or more fluid inflow lines 55 and is configured for discharge of formation fluid 45 from the formation sampling tool 100 into the wellbore 30 at a location farther from the drill bit 15 than the first ferrofluidic seal 20'; and a pump 70 configured to pump formation fluid 45 into the formation sampling tool 100 via each of the formation fluid inflow sections 55. Method 200 further comprises, at 220, while (intermittently or continuously) continuing drilling, circulating ferrofluid 5 from the ferrofluid reservoir 95 to one or more magnets of each of the plurality of ferrofluidic seals 20 to form each of the plurality of ferrofluidic seals 20, while bypassing drilling fluid around and/or through the formation sampling tool 100 via the bypass 25. Method 200 further comprises, at 230, passing formation fluid 45 from the formation 50 through each of the formation fluid inflow sections 40 and the one or more fluid inflow lines 55 and out the formation sampling tool 100 via the discharge outlet 75 until a sampling time. Formation fluid 45 can be passed from the formation 50 through each of the formation fluid inflow sections 40 and the one or more fluid inflow lines 55 and out the formation sampling tool 100 via the discharge outlet 75 until a reading from one or more of the sensors on the one or more fluid inflow lines 55 determines that the formation fluid in the one or more fluid inflow lines 55 is clean enough for sampling or a predetermined set of conditions has been achieved, such as but not limited to maximum sampling time or maximum pumpout volume. In such embodiments, the one or more sensors S can be configured to measure a contamination of formation fluid flowing into the formation sampling tool 100, and the sampling time can be a time at which the one or more sensors S determines the formation fluid flowing into the formation sampling tool 100 has a desired purity for sampling. Method 200 of formation sampling further comprises, at 240, sampling the formation fluid 45.

Figure 6:
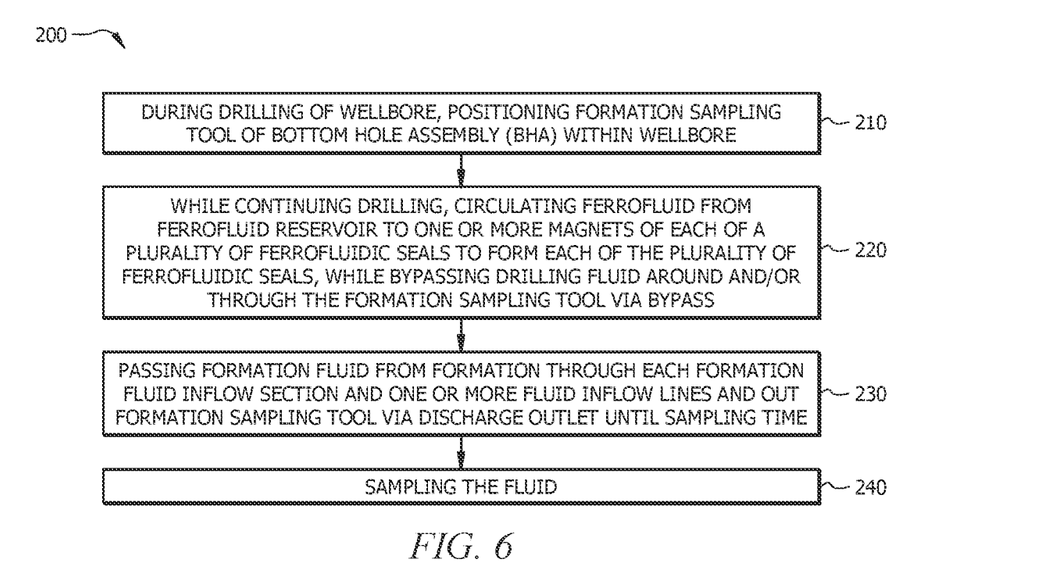
FIG. 6 is a schematic flow diagram of a method, according to embodiments of this disclosure.

Sampling the formation fluid 45 at 240 can comprise determining one or more parameters of the formation fluid 45 from one or more of the fluid inflow sections 40 via the one or more sensors S and/or taking a sample of the formation fluid 45 from the one or more fluid inflow sections 40. In embodiments, the one or more fluid inflow sections 40 sampled comprises or consists of the fluid inflow section of the one or more fluid inflow sections 40' farthest from the drill bit 15, i.e., the distal fluid inflow section 40'.

In embodiments, sampling at 240 include performing a mini-drill stem test (DST) via the formation sampling tool 100. A mini DST can include a plot of pressure versus time. In such embodiments, the one or more sensors S can include pressure sensors. A mini-DST moves sufficient volume of fluid through the formation that a steady state or pseudo steady state flow is achieved which may be radial flow. Such flow conditions can allow mobility to be determined with respect to a more pure formation fluid than simply a pressure test and a better volume of rock probed than a pressure test, and cam also provide a better estimate of formation pressure upon buildup from the pumpout.

Method 200 can further include maintaining a strength of each of the ferrofluidic seals 20 by continuously refreshing the continuously circulating ferrofluid 5. Continuously refreshing indicates maintaining a "clean" ferrofluid in the circulating ferrofluid 5, by regenerating the circulating ferrofluid 5 through the regenerating section 90 and/or introducing clean ferrofluid from reservoir 95 into the circulating ferrofluid. In aspects, continuously refreshing the ferrofluid comprises replacing the entire volume of circulating ferrofluid forming the ferrofluidic seals 20 every few min to every few seconds, and/or maintaining the circulating ferrofluid at a purity of greater than or equal to 80, 85, 90, 95, 96, 97, 98, 99, or substantially 100 volume percent (vol %) ferrofluid. Sensors used to detect the ferrofluidic sealing effectiveness or ferrofluid strength or effectiveness or purity or composition or other correlative physical or chemical property can be use optimize the refresh rate and or introduce new ferrofluid from the reservoir 95. For instance, measuring the magnetic strength of the ferrofluidic or the response of the ferrofluid to a magnetic can provide an indication of necessary refresh rate in order to maintain acceptable levels in order to maintain a seal at a given pressure differential. In some embodiments, if the formation fluid is not very miscible with the ferrofluid, such as but not limited to gas pumpouts, volatile oil pumpouts, or light oil pumpouts, the refresh rate may be extended to tens of min, to a few hours. In aspects, the ferrofluid 5 can be refreshed substantially as described in "Ferrofluid rotary seal with replenishment system for sealing liquids", by Karoen van der Wal, Ron A. J. van Ostayen, Stefan G. E. Lampaert, Tribology International 150 (2020) 106372, May 2020, which is herein incorporated by reference for purposes not contrary to this disclosure.

Refreshing the circulating ferrofluid 5 can comprise passing the continuously circulating ferrofluid 5 through a filter 91, an aqueous semipermeable membrane or tube 92, an organic semipermeable membrane or tube 93, or a combination thereof to remove solids/particulates 91', water 92', organic liquid 93', or a combination thereof, respectively, from the continuously circulating ferrofluid 5, thus providing a refreshed ferrofluid 5. It should be noted that the order or combination of aqueous, organic and solid removal is not meant to be limiting. That is, the circulating ferrofluid 5 can pass through filter 91, aqueous semipermeable membrane or tube 92, organic semipermeable membrane or tube 93, or any combination thereof in any order or arrangement.

In embodiments, the formation sampling tool 100 is moving along the formation 50 and optionally also rotating during the drilling. For example, in aspects, the method 200 provides for measuring while drilling and/or sampling while drilling, and the BHA 10 is moving in a direction along the wellbore 30 being drilled intermittently or continuously during method 200.

The plurality of ferrofluidic seals 20 can, in embodiments, provide a "high" pressure liquid containment seal stable to a pressure, although, in some embodiments, can be employed to maintain a low pressure differential. For example, the plurality of ferrofluidic seals 20 can, in embodiments, provide a liquid containment seal stable to a pressure of at least from a few pounds per square inch (psi) to about 5000 psi, or a pressure of at least about 5000 psi below hydrostatic pressure to about 5000 psi above hydrostatic pressure.

Figure 7:
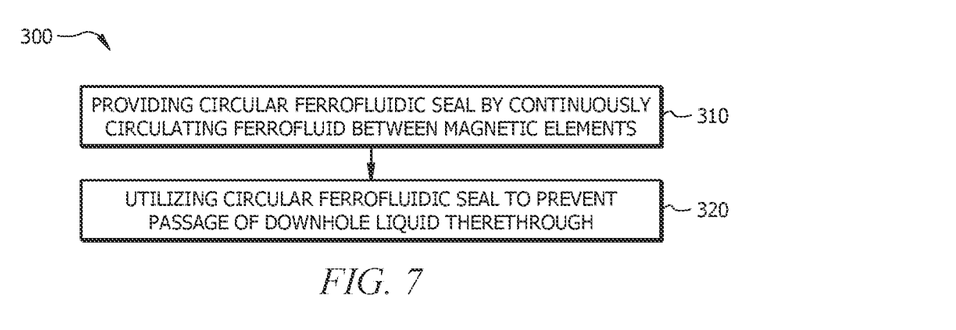
FIG. 7 is a schematic flow diagram of a method, according to embodiments of this disclosure.

With reference to FIG. 7, which is a schematic flow diagram of a method 300 according to embodiments of this disclosure, also provided herein is a method 300 comprising: at 310, providing a circular ferofluidic seal 20 by continuously circulating a ferrofluid 5 between magnetic elements 80; and, at 320, utilizing the circular ferrofluidic seal 20 to prevent the passage of a downhole liquid therethrough.

In aspects, utilizing the circular ferrofluidic seal 20 to prevent the passage of a downhole liquid therethrough at 320 can further comprise utilizing the circular ferrofluidic seal 50 to direct a flow of formation fluid 45 from a formation 50 during sampling while drilling with a drill bit 15 attached to a drill string 11.

Method 300 can further include continuously or semi-continuously monitoring the formation 50 via one or more sensors S to map the formation 50 through which the drill string 11 is being drilled.

Method 300 can further include continuously or semi-continuously monitoring the continuously circulating ferrofluid 5 to determine a refresh rate of the ferrofluid 5 to maintain the circular ferrofluidic seal 20. The method can comprise refreshing the circulating ferrofluid via passage through a regenerating section 90, such as described hereinabove with reference to FIG. 3. The regenerating section 90 can be operable to remove non-ferrofluid contaminants from the circulating ferrofluid 5, thus enabling maintenance of a desired strength of the ferrofluidic seal(s) 20.

In aspects, sampling while drilling at 320 can include taking one or more samples (e.g., via one or more sample chambers 65) and/or measuring one or more parameters of the formation fluid in the formation being drilled.

In embodiments, a method comprises: engaging a plurality of ferrofluidic seals 20 with a wellbore wall 35 of a wellbore 30 being drilled; withdrawing formation fluid from a sampling point along the wellbore 30 as the plurality of ferrofluidic seals move downhole with a bottom hole assembly as the wellbore is being drilled; and, once the formation fluid being withdrawn from the formation at the sampling point achieves a desired purity, sampling the formation fluid via one or more sensors S and/or one or more sample chambers 65.

Because the formation sampling tool is 100 rotating while the drill string 11 is drilling, or at least moving along the formation 50 as the formation 50 is penetrated, a conventional packer or pad will be destroyed if it tries to make contact with the formation 50. The ferrofluidic seal(s) 20 described herein provide a liquid "packer" or "pad", held in place by magnets 80, and therefore has no issue with deformation, and also has low coefficients of friction against the formation 50. Formation fluid 45 can be drawn into the formation sampling tool 100 continuously and sampled when desired. Multiple liquid packers (e.g., multiple ferrofluidic seals 20) can be used to focus the formation fluid 50 and obtain a clean sample.

The disclosed formation sampling tool 100 provides for liquid formation sealing capability, liquid contact with the formation 50, and the exclusion of wellbore fluid (mud, or formation fluid) from the formation sampling tool 100.

The disclosed formation sampling tool 100 enables sampling while drilling (i.e., no need to stop drilling prior to sampling). Potentially even if the fluid is not sampled, it can be characterized along a formation 50 continuously with sensors S in the formation sampling tool 100. Furthermore, pressure testing can be conducted via a mini-DST (e.g., continuously) to obtain formation 50 pressure nearly continuously without stopping the drilling process.

Via this disclosure, ferrofluidic sealing technology can be adapted to accommodate a high pressure liquid containment sealing for drilling.

The disclosed formation sampling tool and method overcome a limitation of contamination in the liquid sealing by continually refreshing the ferrofluid 5. The ferromagnetic field of the ferrofluid 5 can be measured, in embodiments, to adjust a refresh rate. The ferrofluid 5 may be pressurized across a filter 91 and then subsequent aqueous semipermeable membrane 92 and organic semipermeable membrane 93 through a thin magnetic element 94 to recondition and recycle the ferrofluid 5. A ferrofluid reservoir 95 may contain a large buffer of ferrofluid 5 in case of consumption or loss. The magnetic elements 80 may be protected by (e.g., metallic or ceramic) shielding element(s) 8.

Multiple ferrofluidic seals 20 consecutively seal the formation sampling tool 100 against the wellbore wall 35 as held in place by the magnetic elements 80. Formation fluid 45 is pulled into the formation sampling tool 100 through each of the ferrofluidic seals or sealing elements 20. As the drill string 11 penetrates the formation 50, the formation fluid pump 70 can continuously pull formation fluid 45 through each of the formation fluid inflow sections 40. Formation fluid 45 can be continuously pulled from the formation 50, such that the formation fluid 45 becomes continuously cleaner (e.g., in the direction indicated by arrow A1) with respect to drilling fluid as the formation 50 is penetrated. The formation fluid 45 may be continuously monitored with sensors S to map the formation fluids 45 through which the drill string 11 is drilled. The formation fluid 45 from any particular section of the wellbore 30, can be pulled from one of the later drilled sections, as these will be lower in drilling fluid filtrate concentration (contamination). Cuttings and drilling fluid flow through a bypass section 25 within the formation sampling tool 100. The ferrofluid 5 can be pulled into the formation sampling tool 100 and recycled by a regenerating section 90. Formation fluids 45 may be diverted into sample chambers 65 at any point.

The disclosed technology can be utilized in combination with conventional packers, conventional pads, probes, or with other tools for which contact with a formation 50 is necessary, for formation testing to enhance the sealing capabilities of conventional sealing.

ADDITIONAL DISCLOSURE

The following are non-limiting, specific embodiments in accordance with the present disclosure:

In a first embodiment, a formation sampling tool 100 comprises a plurality of ferrofluidic seals 20 for sealing the formation sampling tool 100 against a wellbore wall 35 of a wellbore 30, each adjacent pair of the plurality of ferrofluidic seals 20 defining a formation fluid inflow section 40 through which formation fluid 45 from a formation 50 enters the formation sampling tool 100 via one or more fluid inflow lines 55, wherein a first ferrofluidic seal 20' of the plurality of ferrofluidic seals is distal a drill bit 15, and wherein a last ferrofluidic seal 20" of the plurality of ferrofluidic seals is proximate the drill bit 15; a formation fluid sampling line 60, wherein the formation fluid sampling line 60 is in fluid communication with the one or more fluid inflow lines 55; one or more sensors S in fluid communication with the one or more fluid inflow lines 55 and/or the formation fluid sampling line 60; and a pump 70 configured to pump formation fluid into the formation sampling tool 100 via each of the formation fluid inflow sections.

A second embodiment can include the formation sampling tool 100 of the first embodiment, wherein the formation fluid sampling line 60 is in fluid communication with one or more sample chambers 65.

A third embodiment can include the formation sampling tool 100 of any one of the first or second embodiments further comprising a discharge outlet 75, wherein the discharge outlet 75 is in fluid communication with the one or more fluid inflow lines 55 and is configured for discharge of formation fluid 45 from the formation sampling tool 100 into the wellbore 30 at a location farther from the drill bit 15 than the first ferrofluidic seal 20'.

A fourth embodiment can include the formation sampling tool 100 of any one of the first to third embodiments, wherein each of the plurality of ferrofluidic seals 20 is provided by one or more magnets attached to an outside surface 85 of the formation sampling tool 100, wherein each of the one or more magnets 80 define a region 7 of continuously circulating ferrofluid 5.

A fifth embodiment can include the formation sampling tool 100 of the fourth embodiment further comprising one or more shielding elements 8.

A sixth embodiment can include the formation sampling tool 100 of the fifth embodiment, wherein each of the one or more shielding elements 8 are metallic or ceramic.

A seventh embodiment can include the formation sampling tool 100 of any one of the first to sixth embodiments further comprising a bypass section 25 through which cuttings and drilling fluid pass through the formation sampling tool 100.

An eighth embodiment can include the formation sampling tool 100 of any one of the first to seventh embodiments further comprising a ferrofluid reservoir 95 in fluid communication with each of the plurality of ferrofluidic seals 20, the ferrofluid reservoir 95 comprising a surplus of ferrofluid 5 above a circulating amount of the ferrofluid 5.

A ninth embodiment can include the formation sampling tool 100 of the eighth embodiment further comprising a regenerating section 90 in fluid communication with each of the plurality of ferrofluidic seals 20, wherein the regenerating section 90 is configured to continuously clean the circulating ferrofluid 5.

A tenth embodiment can include the formation sampling tool 100 of the ninth embodiment, wherein the regenerating section 90 further comprises a filter 91, an aqueous semipermeable membrane or tube 92, an organic semipermeable membrane or tube 93, or a combination thereof to remove particulates, water, organic liquid, or a combination thereof, respectively, from the circulating ferrofluid 5, thus providing a regenerated ferrofluid 5.

An eleventh embodiment can include the formation sampling tool 100 of the tenth embodiment, wherein the aqueous semipermeable membrane or tube 92, the organic semipermeable membrane or tube 93, or both comprise a magnetic wire 94 on an inlet side 96 thereof to prevent the ferrofluid 5 from leaking through the aqueous semipermeable membrane or tube 92, the organic semipermeable membrane or tube 93, or both, respectively.

In an twelfth embodiment, a method of formation sampling comprises: during drilling of a wellbore 30, positioning a formation sampling tool 100 of a bottom hole assembly (BHA) 10 within the wellbore 30, wherein the formation sampling tool 100 comprises: a plurality of magnets 80 attached to an outside surface 85 of the formation sampling tool 100, and configured to provide a plurality of ferrofluidic seals 20 for sealing the formation sampling tool 100 against a wellbore wall 35 of a wellbore 30, each adjacent pair of the plurality of ferrofluidic seals 20 defining a formation fluid inflow section 40 through which formation fluid 45 from a formation 50 enters the formation sampling tool 100 via one or more fluid inflow lines 55, wherein a first ferrofluidic seal 20' of the plurality of ferrofluidic seals 20 is distal a drill bit 15, and wherein a last ferrofluidic seal 20" of the plurality of ferrofluidic seals 20 is proximate the drill bit 15, and wherein each of the one or more magnets 80 define a region 7 for continuously circulating ferrofluid 5; a formation fluid sampling line 60, wherein the formation fluid sampling line 60 is in fluid communication with the one or more fluid inflow lines 55; one or more sensors S in fluid communication with the one or more fluid inflow lines 55 and/or the formation fluid sampling line 60; a ferrofluid reservoir 95 in fluid communication with each of the plurality of ferrofluidic seals 20, the ferrofluid reservoir 95 comprising a surplus of ferrofluid 5 above a circulating amount of the ferrofluid 5; a bypass section 25 via which cuttings and drilling fluid pass through the formation sampling tool 100; a discharge outlet 75, wherein the discharge outlet 75 is in fluid communication with the one or more fluid inflow lines 55 and is configured for discharge of formation fluid 45 from the formation sampling tool 100 into the wellbore 30 at a location farther from the drill bit 15 than the first ferrofluidic seal 20'; and a pump 70 configured to pump formation fluid 45 into the formation sampling tool 100 via each of the formation fluid inflow sections 55; while (intermittently or continuously) continuing drilling, circulating ferrofluidic fluid 5 from the ferrofluid reservoir 95 to each of the plurality of magnets 80 to form each of the plurality of ferrofluidic seals 20, while bypassing drilling fluid around the formation sampling tool 100 via the bypass 25; passing formation fluid 45 from the formation 50 through each of the formation fluid inflow sections 40 and the one or more fluid inflow lines 55 and out the formation sampling tool 100 via the discharge outlet 75 until a sampling time; and sampling the formation fluid 45.

A thirteenth embodiment can include the method of the twelfth embodiment, wherein sampling the formation fluid 45 comprises determining one or more parameters of the formation fluid 45 from one or more of the fluid inflow sections 40 via the one or more sensors S and/or taking a sample of the formation fluid 45 from the one or more fluid inflow sections 40.

A fourteenth embodiment can include the method of the thirteenth embodiment, wherein the one or more fluid inflow sections 40 comprises the fluid inflow section of the one or more fluid inflow sections 40' farthest from the drill bit 15.

A fifteenth embodiment can include the method of any one of the twelfth to fourteenth embodiments further comprising performing a mini-drill stem test (DST) via the formation sampling tool 100.

A sixteenth embodiment can include the method of any one of the twelfth to fifteenth embodiments further comprising maintaining a strength of each of the ferrofluidic seals 20 by continuously refreshing the continuously circulating ferrofluid 5.

A seventeenth embodiment can include the method of the sixteenth embodiment, wherein refreshing comprises passing the continuously circulating ferrofluid 5 through a filter 91, an aqueous semipermeable membrane or tube 92, an organic semipermeable membrane or tube 93, or a combination thereof to remove particulates, water, organic liquid, or a combination thereof, respectively, from the continuously circulating ferrofluid 5, thus providing a refreshed ferrofluid 5.

An eighteenth embodiment can include the method of any one of the twelfth to seventeenth embodiments, wherein the formation sampling tool 100 is moving along the formation 50 and optionally also rotating during the drilling.

A nineteenth embodiment can include the method of any one of the twelfth to eighteenth embodiments, wherein each of the plurality of ferrofluidic seals 20 provide a liquid containment seal stable to a pressure of at least 5000 psi below hydrostatic pressure to 5000 psi above hydrostatic pressure.

In a twentieth embodiment, a method comprises: providing a circular ferrofluidic seal 20 by continuously circulating a ferrofluid 5 between magnetic elements 80; and utilizing the circular ferrofluidic seal 20 to prevent the passage of a downhole liquid therethrough.

A twenty first embodiment can include the method of the twentieth embodiment, wherein utilizing further comprises utilizing the circular ferrofluidic seal 50 to direct a flow of formation fluid 45 from a formation 50 during sampling while drilling with a drill bit 15 attached to a drill string 11.

A twenty second embodiment can include the method of the twenty first embodiment further comprising continuously or semi-continuously monitoring the formation 50 via one or more sensors S to map the formation 50 through which the drill string 11 is drilled.

A twenty third embodiment can include the method of any one of the twentieth to twenty second embodiments further comprising continuously or semi-continuously monitoring the continuously circulating ferrofluid 5 to determine a refresh rate of the ferrofluid 5 to maintain the circular ferrofluidic seal 20.

In a twenty fourth embodiment, a method comprises: engaging a plurality of ferrofluidic seals 20 with a wellbore wall 35 of a wellbore 30 being drilled; and withdrawing formation fluid from a sampling point along the wellbore 30 as the plurality of ferrofluidic seals move downhole with a bottom hole assembly as the wellbore is being drilled; once the formation fluid being withdrawn from the formation at the sampling point achieves a desired purity, sampling the formation fluid via one or more sensors S and/or one or more sample chambers 65.

In a twenty fifth embodiment, a formation sampling tool 100 comprises: a housing 84 and a plurality of ferrofluidic seals 20 disposed about the housing 84 and providing a seal between a wellbore wall 35 of a wellbore 30 being drilled and the formation sampling tool 100, wherein each of the ferrofluidic seals comprise a ferrofluid substantially continuously circulating between magnetic elements.

A twenty sixth embodiment can include the formation sampling tool 100 of the twenty fifth embodiment further comprising a regenerating section 90, a ferrofluid reservoir 95, or both, wherein the regenerating section 90 is in fluid communication with each of the plurality of ferrofluidic seals 20 and is configured to continuously clean the continuously circulating ferrofluid 5, and wherein the ferrofluid reservoir 95 is in fluid communication with each of the plurality of ferrofluidic seals 20, and contains a surplus of ferrofluid 5 above a circulating amount of the ferrofluid 5.

A twenty seventh embodiment can include the formation sampling tool of any one of the twenty fifth or twenty sixth embodiments further comprising a bypass section 25 via which cuttings and drilling fluid pass through the formation sampling tool 100.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A formation sampling tool comprising:
   a plurality of ferrofluidic seals for sealing the formation sampling tool against a wellbore wall of a wellbore, wherein the plurality of ferrofluidic seals comprise adjacent pairs, wherein each adjacent pair of the plurality of ferrofluidic seals defines a formation fluid inflow section through which formation fluid from a formation enters the formation sampling tool via one or more fluid inflow lines, wherein a first ferrofluidic seal of the plurality of ferrofluidic seals is distal a drill bit, and wherein a last ferrofluidic seal of the plurality of ferrofluidic seals is proximate the drill bit;
   a regeneration section and/or a ferrofluid reservoir;
   a ferrofluid pump configured to circulate ferrofluid to each of the ferrofluidic seals via the regenerating section and/or the reservoir, through a region of continuously circulating ferrofluid and back to the regenerating section and/or the reservoir;
   a formation fluid sampling line, wherein the formation fluid sampling line is in fluid communication with the one or more fluid inflow lines;
   one or more sensors in fluid communication with the one or more fluid inflow lines and/or the formation fluid sampling line; and
   a formation fluid pump configured to pump formation fluid into the formation sampling tool via each of the formation fluid inflow sections.

2. The formation sampling tool of claim 1, wherein the formation fluid sampling line is in fluid communication with one or more sample chambers.

3. The formation sampling tool of claim 1 further comprising a discharge outlet, wherein the discharge outlet is in fluid communication with the one or more fluid inflow lines and is configured for discharge of formation fluid from the formation sampling tool into the wellbore at a location farther from the drill bit than the first ferrofluidic seal.

4. The formation sampling tool of claim 1, wherein each of the plurality of ferrofluidic seals is provided by one or more magnets attached to an outside surface of the formation sampling tool, wherein each of the one or more magnets define a region of continuously circulating ferrofluid.

5. The formation sampling tool of claim 4 further comprising one or more shielding elements.

6. The formation sampling tool of claim 5, wherein each of the one or more shielding elements are metallic or ceramic.

7. The formation sampling tool of claim 1 further comprising a bypass section through which cuttings and drilling fluid pass through the formation sampling tool.

8. The formation sampling tool of claim 1 further comprising a ferrofluid reservoir in fluid communication with each of the plurality of ferrofluidic seals, the ferrofluid reservoir comprising a surplus of ferrofluid above a circulating amount of the ferrofluid.

9. The formation sampling tool of claim 8 further comprising a regenerating section in fluid communication with each of the plurality of ferrofluidic seals, wherein the regenerating section is configured to continuously clean the circulating ferrofluid.

10. A method of formation sampling, the method comprising:
- during drilling of a wellbore, positioning a formation sampling tool of a bottom hole assembly (BHA) within the wellbore, wherein the formation sampling tool comprises:
- a plurality of magnets attached to an outside surface of the formation sampling tool, and configured to provide a plurality of ferrofluidic seals for sealing the formation sampling tool against a wellbore wall of a wellbore, wherein the plurality of ferrofluidic seals comprise adjacent pairs, wherein each adjacent pair of the plurality of ferrofluidic seals defines a formation fluid inflow section through which formation fluid from a formation enters the formation sampling tool via one or more fluid inflow lines, wherein a first ferrofluidic seal of the plurality of ferrofluidic seals is distal a drill bit, and wherein a last ferrofluidic seal of the plurality of ferrofluidic seals is proximate the drill bit, and wherein each of the one or more magnets define a region for continuously circulating ferrofluid;
- a regeneration section and/or a ferrofluid reservoir in fluid communication with each of the plurality of ferrofluidic seals, the ferrofluid reservoir comprising a surplus of ferrofluid above a circulating amount of the ferrofluid;
- a ferrofluid pump configured to circulate ferrofluid to each of the ferrofluidic seals via the regenerating section and/or the reservoir, through the region of continuously circulating ferrofluid and back to the regenerating section and/or the reservoir;
- a formation fluid sampling line, wherein the formation fluid sampling line is in fluid communication with the one or more fluid inflow lines;
- one or more sensors in fluid communication with the one or more fluid inflow lines and/or the formation fluid sampling line;
- a bypass section via which cuttings and drilling fluid pass through the formation sampling tool;
- a discharge outlet, wherein the discharge outlet is in fluid communication with the one or more fluid inflow lines and is configured for discharge of formation fluid from the formation sampling tool into the wellbore at a location farther from the drill bit than the first ferrofluidic seal; and
- a pump configured to pump formation fluid into the formation sampling tool via each of the formation fluid inflow sections;

while continuing drilling, circulating ferrofluidic fluid from the ferrofluid reservoir and/or the regeneration section to each of the plurality of magnets to form each of the plurality of ferrofluidic seals and back to the ferrofluid reservoir and/or the regeneration section, while bypassing drilling fluid around the formation sampling tool via the bypass;

passing formation fluid from the formation through each of the formation fluid inflow sections and the one or more fluid inflow lines and out the formation sampling tool via the discharge outlet until a sampling time; and sampling the formation fluid.

11. The method of claim 10, wherein sampling the formation fluid comprises determining one or more parameters of the formation fluid from one or more of the fluid inflow sections via the one or more sensors and/or taking a sample of the formation fluid from the one or more fluid inflow sections.

12. The method of claim 11, wherein the one or more fluid inflow sections comprises the fluid inflow section of the one or more fluid inflow sections farthest from the drill bit.

13. The method of claim 10 further comprising maintaining a strength of each of the ferrofluidic seals by continuously refreshing the continuously circulating ferrofluid.

14. The method of claim 10, wherein the formation sampling tool is moving along the formation and optionally also rotating during the drilling.

15. The method of claim 10, wherein each of the plurality of ferrofluidic seals provide a liquid containment seal stable to a pressure of at least 5000 psi below hydrostatic pressure to 5000 psi above hydrostatic pressure.

16. A method of formation sampling, the method comprising:
- during drilling of a wellbore, positioning a formation sampling tool of a bottom hole assembly (BHA) within the wellbore, wherein the formation sampling tool comprises:
- a plurality of magnets attached to an outside surface of the formation sampling tool, and configured to provide a plurality of ferrofluidic seals for sealing the formation sampling tool against a wellbore wall of a wellbore, wherein the plurality of ferrofluidic seals comprise adjacent pairs, wherein each adjacent pair of the plurality of ferrofluidic seals defines a formation fluid inflow section through which formation fluid from a formation enters the formation sampling tool via one or more fluid inflow lines, wherein a first ferrofluidic seal of the plurality of ferrofluidic seals is distal a drill bit, and wherein a last ferrofluidic seal of the plurality of ferrofluidic seals is proximate the drill bit, and wherein each of the one or more magnets define a region for continuously circulating ferrofluid;
- a formation fluid sampling line, wherein the formation fluid sampling line is in fluid communication with the one or more fluid inflow lines;
- one or more sensors in fluid communication with the one or more fluid inflow lines and/or the formation fluid sampling line;
- a ferrofluid reservoir in fluid communication with each of the plurality of ferrofluidic seals, the ferrofluid reservoir comprising a surplus of ferrofluid above a circulating amount of the ferrofluid;
- a bypass section via which cuttings and drilling fluid pass through the formation sampling tool;

a discharge outlet, wherein the discharge outlet is in fluid communication with the one or more fluid inflow lines and is configured for discharge of formation fluid from the formation sampling tool into the wellbore at a location farther from the drill bit than the first ferrofluidic seal; and a pump configured to pump formation fluid into the formation sampling tool via each of the formation fluid inflow sections:

while continuing drilling, circulating ferrofluidic fluid from the ferrofluid reservoir to each of the plurality of magnets to form each of the plurality of ferrofluidic seals, while bypassing drilling fluid around the formation sampling tool via the bypass, and maintaining a strength of each of the ferrofluidic seals by continuously refreshing the continuously circulating ferrofluid, wherein refreshing comprises passing the continuously circulating ferrofluid through a filter, an aqueous semipermeable membrane or tube, an organic semipermeable membrane or tube, or a combination thereof to remove particulates, water, organic liquid, or a combination thereof, respectively, from the continuously circulating ferrofluid, thus providing a refreshed ferrofluid;

passing formation fluid from the formation through each of the formation fluid inflow sections and the one or more fluid inflow lines and out the formation sampling tool via the discharge outlet until a sampling time; and sampling the formation fluid.

17. A method comprising:

providing one or more circular ferrofluidic seals by continuously circulating a ferrofluid from a ferrofluid reservoir and/or a regeneration section to a region of circulating ferrofluid between each of one or more pairs of magnets and back to the ferrofluid reservoir and/or the regeneration section; and utilizing the circular ferrofluidic seals to prevent the passage of a downhole liquid therethrough.

18. The method of claim 17, wherein utilizing further comprises utilizing the circular ferrofluidic seal to direct a flow of formation fluid from a formation during sampling while drilling with a drill bit attached to a drill string.

19. The method of claim 18 further comprising continuously or semi-continuously monitoring the formation via one or more sensors to map the formation through which the drill string is drilled.

20. A method comprising:

providing a circular ferrofluidic seal by continuously circulating a ferrofluid between magnetic elements;

utilizing the circular ferrofluidic seal to prevent the passage of a downhole liquid therethrough; and continuously or semi-continuously monitoring the continuously circulating ferrofluid to determine a refresh rate of the ferrofluid to maintain the circular ferrofluidic seal.

* * * * *